United States Patent
Wang

(10) Patent No.: US 8,816,657 B2
(45) Date of Patent: Aug. 26, 2014

(54) MULTI-PHASE DC-DC POWER CONVERTER

(75) Inventor: Han-Pang Wang, Tainan County (TW)

(73) Assignee: uPI Semiconductor Corp., Hsinchu County (TW)

( * ) Notice: Subject to any disclaimer, the term of this patent is extended or adjusted under 35 U.S.C. 154(b) by 0 days.

(21) Appl. No.: 13/495,965

(22) Filed: Jun. 13, 2012

(65) Prior Publication Data

US 2013/0038312 A1 Feb. 14, 2013

(30) Foreign Application Priority Data

Aug. 12, 2011 (TW) .............................. 100128940 A

(51) Int. Cl.
  *G05F 1/00* (2006.01)
  *H02M 3/158* (2006.01)

(52) U.S. Cl.
  CPC .... *H02M 3/1584* (2013.01); *H02M 2003/1586* (2013.01)
  USPC .......................................................... 323/272

(58) Field of Classification Search
  CPC ...................... H02M 3/158; H02M 2001/0045; H02M 3/1588; H02M 3/1584; H02M 3/156; H02M 5/2573; G05F 1/445
  USPC ......... 323/225, 268, 271, 272, 282, 285, 288, 323/326, 350, 351
  See application file for complete search history.

(56) References Cited

U.S. PATENT DOCUMENTS

| | | | |
|---|---|---|---|
| 7,474,086 B2 * | 1/2009 | Chen et al. ..................... | 323/288 |
| 7,589,511 B2 * | 9/2009 | Dong et al. ................... | 323/271 |
| 2010/0033154 A1 * | 2/2010 | Cheng et al. .................. | 323/293 |
| 2010/0148740 A1 * | 6/2010 | Saitoh ........................... | 323/283 |
| 2011/0031948 A1 * | 2/2011 | Chien et al. ................... | 323/282 |
| 2011/0109284 A1 * | 5/2011 | Houston et al. ............... | 323/272 |

\* cited by examiner

*Primary Examiner* — Gary L Laxton
*Assistant Examiner* — Alex Torres-Rivera
(74) *Attorney, Agent, or Firm* — J.C. Patents

(57) ABSTRACT

A multi-phase DC-DC power converter including a pulse width modulation (PWM) controller and a plurality of output stage circuits is provided. The output stage circuits convert an input voltage into an output voltage. The PWM controller includes a PWM generation module, a ramp generator and a feedback circuit. The feedback circuit generates a trigger signal according to the output voltage and a ramp signal. The PWM generation module generates a PWM signal with a constant on time, and adjusts a duty cycle of the PWM signal according to the trigger signal, the input and output voltages, so as to control phase channels of the multi-phase DC-DC power converter in order.

9 Claims, 6 Drawing Sheets

MULTI-PHASE DC-DC POWER CONVERTER

CROSS-REFERENCE TO RELATED APPLICATION

This application claims the priority benefit of Taiwan application Ser. No. 100128940, filed on Aug. 12, 2011. The entirety of the above-mentioned patent application is hereby incorporated by reference herein and made a part of this specification.

BACKGROUND OF THE INVENTION

1. Field of the Invention

The invention relates to a multi-phase direct current (DC)-DC power converter. Particularly, the invention relates to a multi-phase DC-DC power converter including a pulse width modulation (PWM) controller with a constant on time (COT).

2. Description of Related Art

Multi-phase DC-DC power converters are applied in different electronic device. A constant on time (COT) regulator is a technique applied in the power converters. Generally, when a feedback voltage is smaller than a reference voltage, the COT regulator can turn on a main switch in a fixed period, and can adjust a turning off time of the main switch to provide a regulated output voltage. Regarding the conventional COT regulator, it is necessary to configure an output capacitor having a high equivalent series resistance (ESR) that is parallel to a load, so as to provide the regulated output voltage. However, in the COT regulator, although the high ESR can provide the regulated output voltage, it probably causes increase of an output ripple, which may have a negative influence on the output voltage of the COT regulator and power conversion efficiency.

A controller unit in the conventional multi-phase DC-DC power converter may generate a triangular wave signal to all of current mode regulators. Each of the current mode regulators can initialise a cycle of the triangular wave signal at different points thereon to implement phase separation required between different channels. The triangular wave signal is an analog signal, which is easy to be influenced by signal aggravation and noise interference. Therefore, the conventional method is limited according to an actual phase separation of different channels. Noise generated by a switching operation of one of the channels may aggravate the triangular wave signal transmitted to the other channels.

SUMMARY OF THE INVENTION

The invention provides a multi-phase DC-DC power converter including a plurality of output stage circuits, a ramp generator, a feedback circuit, a pulse width modulation (PWM) generator, a phase channel current sensor and a phase channel selector. The output stage circuits receive an input voltage and provide an output voltage. The ramp generator is used for generating a ramp signal, wherein the ramp signal has fixed rising and falling slopes. The feedback circuit is coupled to the ramp generator and output terminals of the output stage circuits, and generates a trigger signal according to the output voltage and the ramp signal. The PWM generator is coupled to the feedback circuit and generates a PWM signal according to the trigger signal, the input voltage and the output voltage. The phase channel current sensor is coupled to the PWM generator, and is used for sensing output currents of the output stage circuits for calculating output current differences of the output stage circuits, so as to output a plurality of error current signals to the PWM generator, and the PWM generator adjusts a duty cycle of the PWM signal according to the error current signals. The phase channel selector is coupled to the PWM generator, the phase channel current sensor and the output stage circuits for controlling operations of the output stage circuits.

The invention is directed to a multi-phase DC-DC power converter including a plurality of output stage circuits and a pulse width modulation (PWM) controller. The output stage circuits convert an input voltage into an output voltage. The PWM controller is coupled to input terminals and output terminals of the output stage circuits, and outputs a PWM signal to sequentially control the output stage circuits to convert the input voltage into the output voltage. The PWM controller includes a PWM generation module, a ramp generator and a feedback circuit. The PWM generation module is coupled to an output terminal of a first comparator and an output terminal of an error amplifier, and generates the PWM signal with a constant on time, and adjusts a duty cycle of the PWM signal according to a trigger signal, the input voltage and the output voltage, and outputs a sensing current according to a load amount of a load of the multi-phase DC-DC power converter. The ramp generator is coupled to a negative input terminal of the first comparator and the PWM module, and is used for generating a ramp signal, where the ramp signal has fixed rising and falling slopes. The feedback circuit is coupled to the ramp generator, the output terminals of the output stage circuits and the PWM generation module, and outputs the trigger signal according to the sensing current, the output voltage and the ramp signal.

The invention is directed to a multi-phase DC-DC power converter including a plurality of output stage circuits and a pulse width modulation (PWM) controller. The output stage circuits convert an input voltage into an output voltage. The PWM controller is coupled to input terminals and output terminals of the output stage circuits, and outputs a PWM signal to sequentially control the output stage circuits to convert the input voltage into the output voltage. The PWM controller includes a PWM generation module and a ramp generator. The PWM generation module generates the PWM signal with a constant on time, and adjusts a duty cycle of the PWM signal according to a trigger signal, the input voltage and the output voltage, and outputs a sensing current according to a load amount of a load of the multi-phase DC-DC power converter. The ramp generator is coupled to the PWM module, and is used for generating a ramp signal, where the ramp signal is a complete sawtooth wave having fixed rising and falling slopes. A feedback circuit is coupled to the ramp generator, the output terminals of the output stage circuits and the PWM generation module, and outputs the trigger signal according to the sensing current, the output voltage and the ramp signal.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In order to make the aforementioned and other features and advantages of the invention comprehensible, several exemplary embodiments accompanied with figures are described in detail below.

Figure 1:
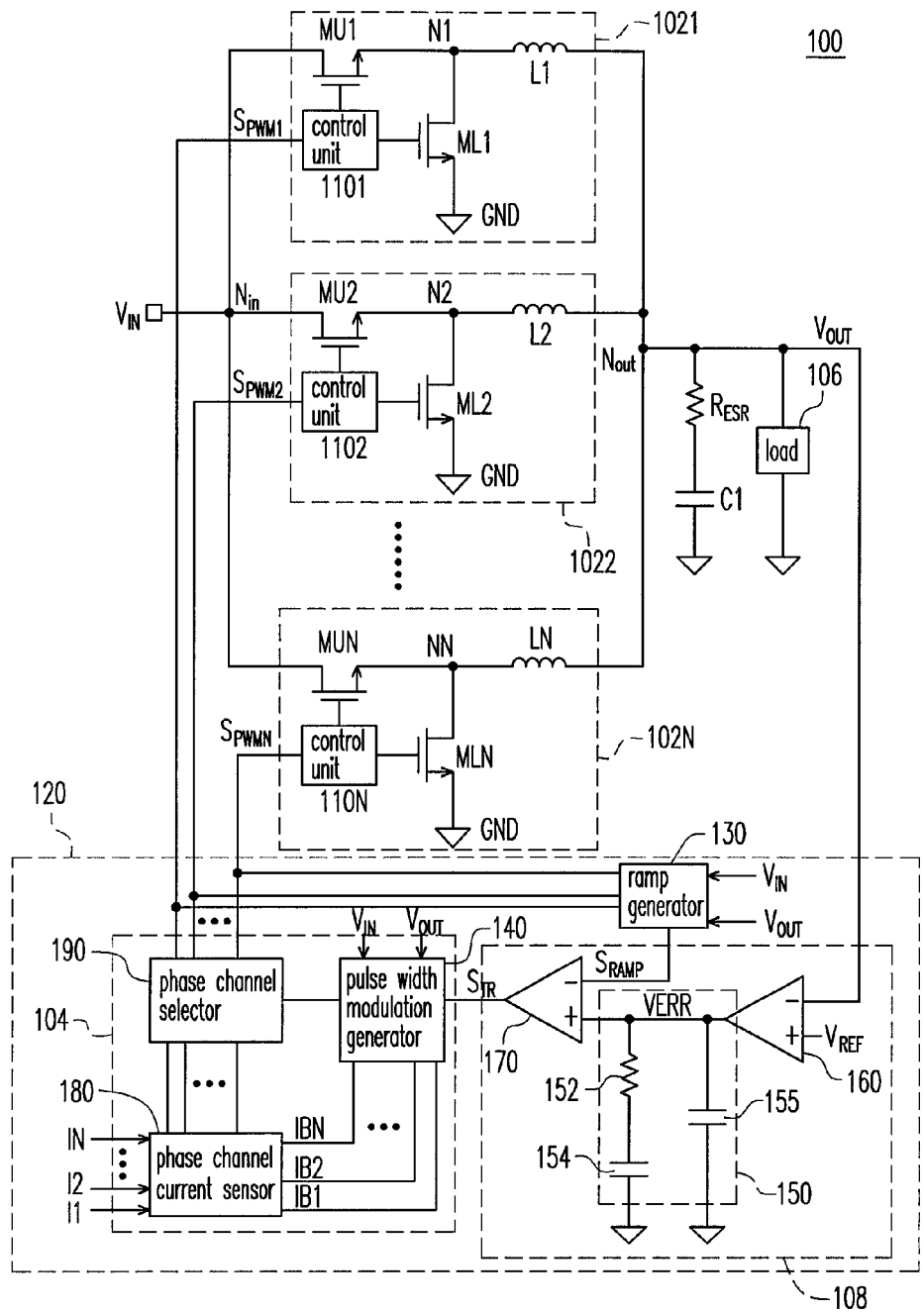
FIG. 1 is a schematic diagram of a multi-phase DC-DC power converter 100 according to an embodiment of the invention.

FIG. 1 is a schematic diagram of a multi-phase DC-DC power converter 100 according to an embodiment of the invention. The multi-phase DC-DC power converter 100 includes a plurality of output stage circuits 1021-102N, a pulse width modulation (PWM) controller 120, a resistor $R_{ESR}$, an output capacitor C1 and a load 106, wherein N is a positive integer.

The output stage circuits 1021-102N are connected in parallel between an input node $N_{in}$, and an output node $N_{out}$ for converting an input voltage $V_{IN}$ received by the input node Nin into an output voltage $V_{OUT}$, and outputting the output voltage $V_{OUT}$ through the output node $N_{out}$. The PWM controller 120 is coupled to input terminals and output terminals (i.e. the output node $N_{out}$) of the output stage circuits 1021-102N, and outputs a PWM signal $S_{PWM}$ (including $S_{PWM1}$-$S_{PWMN}$, and for simplicity's sake, $S_{PWM}$ is used to represent any one of the $S_{PWM1}$-$S_{PWMN}$) to control the output stage circuits 1021-102N to convert the input voltage $V_{IN}$ into the output voltage $V_{OUT}$. Moreover, the resistor $R_{ESR}$ is an equivalent series resistance (ESR) of the output capacitor C1, which has a relatively low resistance. According to FIG. 1, it is obvious that the output capacitor C1 having relatively low ESR is coupled between the output node $N_{out}$ and a ground terminal GND, and the load 106 is coupled between the output node $N_{out}$ and the ground terminal GND.

The PWM controller 120 includes a ramp generator 130, a PWM generation module 104 and a feedback circuit 108. The ramp generator 130 is coupled to the PWM generation module 104, and is used for generating a ramp signal $S_{RAMP}$. The feedback circuit 108 is coupled to the ramp generator 130, the output terminals (i.e. the output node $N_{out}$) of the output stage circuits 1021-102N and the PWM generation module 104. The feedback circuit 108 outputs a trigger signal $S_{TR}$ according to the output voltage $V_{OUT}$ and the ramp signal $S_{RAMP}$.

In the present embodiment, the feedback circuit 108 includes a compensation unit 150, an error amplifier 160 and a comparator 170. A positive input terminal and a negative input terminal of the error amplifier 160 respectively receive a reference voltage $V_{REF}$ and the output voltage $V_{OUT}$. The error amplifier 160 generates an error signal $V_{ERR}$ according to a voltage difference between the reference voltage $V_{REF}$ and the output voltage $V_{OUT}$. The compensation unit 150 is coupled between a positive input terminal of the comparator 170 and an output terminal of the error amplifier 160, and is used for compensating the error signal $V_{ERR}$.

After the compensation unit 150 compensated the error signal $V_{ERR}$, the comparator 170 compares the compensated error signal $V_{ERR}$ with the ramp signal $S_{RAMP}$ provided by the ramp generator 130 to generate the trigger signal $S_{TR}$. The PWM generation module 104 is coupled to an output terminal of the comparator 170, and generates PWM signals $S_{PWM1}$-$S_{PWMN}$ with a constant on time, and adjusts duty cycles of the PWM signals $S_{PWM1}$-$S_{PWMN}$ according to the trigger signal $S_{TR}$, the input voltage $V_{IN}$ and the output voltage $V_{OUT}$. In the present embodiment, the compensation unit 150 includes a resistor 152, a capacitor 154 and a capacitor 155, where the resistor 152 and the capacitor 154 are connected in series between the output terminal of the error amplifier 160 and the ground germinal GND, and the capacitor 155 is coupled between the output terminal of the error amplifier 160 and the ground germinal GND.

In this embodiment, the ramp generator 130 generates the ramp signal $S_{RAMP}$ according to the PWM signals $S_{PWM1}$-$S_{PWMN}$, the input voltage $V_{IN}$ and the output voltage $V_{OUT}$. In some embodiments, the ramp signal $S_{RAMP}$ has fixed rising and falling slopes, and is not influenced by the PWM signals $S_{PWM1}$-$S_{PWMN}$, the input voltage $V_{IN}$ and the output voltage $V_{OUT}$.

Further, the PWM generation module 104 includes a PWM generator 140, a phase channel selector 190 and a phase channel current sensor 180. The phase channel selector 190 is coupled to the PWM generator 140, the phase channel current sensor 180 is coupled to the phase channel selector 190 and the PWM generator 140, and the PWM generator 140 is coupled to the output terminal of the comparator 170. The PWM generator 140 and the phase channel selector 190 generate the PWM signals $S_{PWM1}$-$S_{PWMN}$ according to the trigger signal $S_{TR}$, the input voltage $V_{IN}$ and the output voltage $V_{OUT}$, and output the PWM signals $S_{PWM1}$-$S_{PWMN}$ to the corresponding output stage circuits 1021-102N. The phase channel current sensor 180 senses output currents of the output stage circuits 1021-102N, and calculates output current differences of the output stage circuits 1021-102N, so as to output error currents signals IB1-IBN to the PWM generator 140.

In the present embodiment, each of the output stage circuits is implemented by a control unit, two transistors and an inductor. As shown in FIG. 1, the multi-phase DC-DC power converter 100 includes 2N transistors MU1-MUN and ML1-MLN, N inductors L1-LN and N control units 1101-110N. The transistors MU1-MUN are respectively coupled between the input node $N_{in}$ and the nodes N1-NN, and the transistors ML1-MLN are respectively coupled between the nodes N1-NN and the ground terminal GND. Gates of the transistors MU1-MUN and gates of the transistors ML1-MLN are respectively coupled to the control units 1101-110N. Moreover, the inductors L1-LN are respectively coupled between the nodes N1-NN and the output node $N_{out}$. In the present embodiment, the transistors MU1-MUN and the transistors ML1-MLN are N-type transistors, which can be used as switches. In other applications, the transistors MU1-MUN and the transistors ML1-MLN can also be P-type transistors, or the P-type and N-type transistors. The control units 1101-110N receives the PWM signals $S_{PWM1}$-$S_{PWMN}$ provided by the PWM controller 120, and controls conducting states of the transistors MU1-MUN and the transistors ML1-MLN according to the PWM signals $S_{PWM1}$-$S_{PWMN}$, so as to convert the input voltage $V_{IN}$ into the output voltage $V_{OUT}$. The output voltage $V_{OUT}$ is output to the load 106 through the output node $N_{out}$.

Figure 2A:
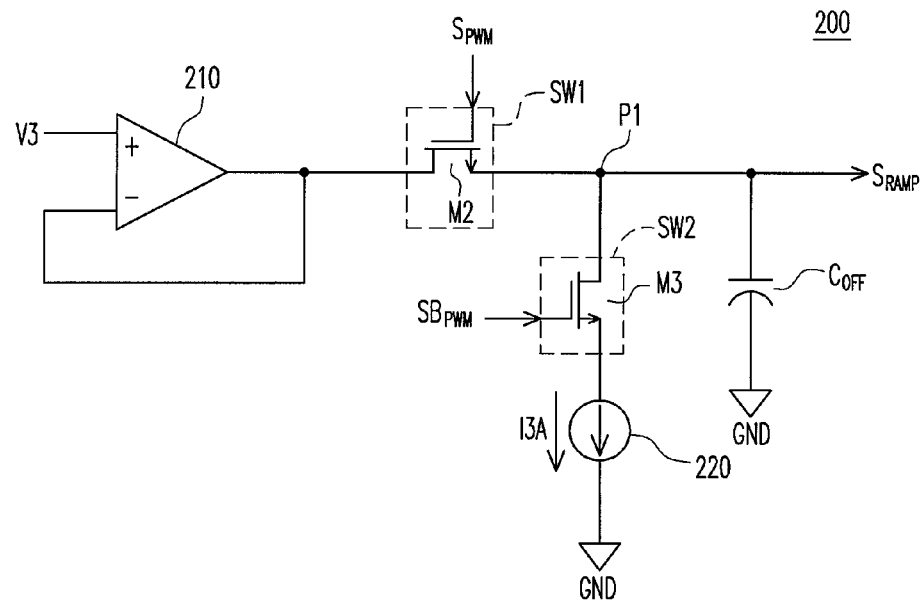
FIG. 2A is circuit diagram of a ramp generator 200 according to an embodiment of the invention.

FIG. 2A is circuit diagram of a ramp generator 200 according to an embodiment of the invention. The ramp generator 200 includes an amplifier 210, two switches SW1 and SW2 (which are respectively implemented by transistors M2 and M3, though the invention is not limited thereto), a capacitor $C_{OFF}$ and a current source 220. A positive input terminal of the amplifier 210 receives a voltage V3, a negative input terminal of the amplifier 210 is coupled to an output terminal thereof, where the voltage V3 is proportional to a voltage difference between the input voltage $V_{IN}$ and the output voltage $V_{OUT}$, i.e. $V3=K3\times K1\times(V_{IN}-V_{OUT})$, and K3 is a constant. It should be noticed that the relationship between the voltage V3 and the input voltage $V_{IN}$ and the output voltage $V_{OUT}$ is only an example, which is not used to limit the invention. The voltage V3 can also be a fixed voltage value that is non-related to the input voltage $V_{IN}$ and the output voltage $V_{OUT}$.

The switch SW1 is coupled between the output terminal of the amplifier 210 and an output terminal of the ramp generator 200, and a conducting state thereof is controlled by the PWM signal $S_{PWM}$. The switch SW2 is coupled between the current source 220 and the output terminal of the ramp generator 200, and a conducting state thereof is controlled by a signal $SB_{PWM}$.

Figure 2B:
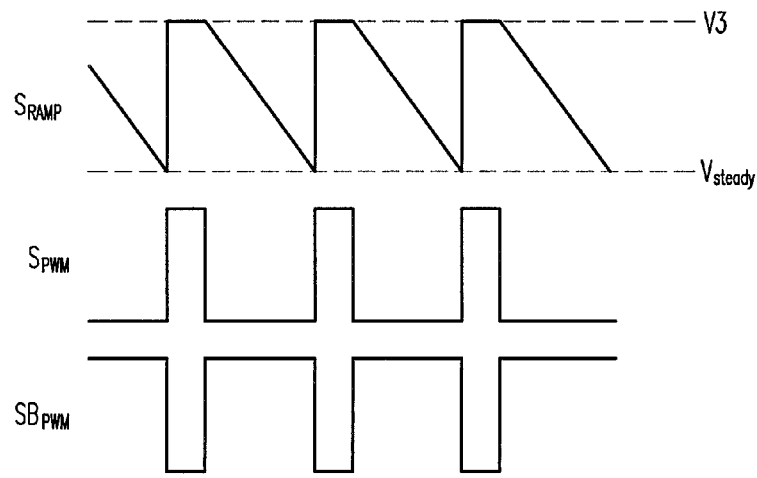
FIG. 2B is a waveform diagram of signals in the ramp generator 200 of FIG. 2A.

FIG. 2B is a waveform diagram of signals in the ramp generator 200 of FIG. 2A. Referring to FIG. 2A and FIG. 2B, the ramp signal $S_{RAMP}$ represents a voltage on a node P1. It should be noticed that the ramp signal $S_{RAMP}$ of FIG. 2B is only an example, which is not used to limit the invention. For example, the ramp signal $S_{RAMP}$ can also be a complete sawtooth wave without partially intercepted by the voltage V3. In the present embodiment, the current source 220 extracts a current I3A from the node P1 to the ground terminal GND, so as to decrease a voltage level of the ramp signal $S_{RAMP}$, where the current I3A is proportional to the input voltage $V_{IN}$. It should be noticed that it is only an example that the current source 220 is proportional to the input voltage $V_{IN}$, which is not used to limit the invention, and I3A can also be a fixed current value non-related to the input voltage $V_{IN}$. In some embodiments, a current value of the current I3A can be the same to a current value of a current I1A of a PWM generator 300 of FIG. 3, for example, $I3A=K1\times V_{IN}/R_{RT}$. Alternatively, the current I3A can also be proportional to the current I1A. Therefore, within a cycle $T_{off}$, a voltage variation $dV_{RAMP}$ of the ramp signal $S_{RAMP}$ can be obtained according to a following equation (1):

$$dV_{RAMP} = \frac{I3}{C_{OFF}}dT \quad (1)$$
$$= \frac{K1\times V_{IN}}{R_{RT}\times C_{OFF}}T_{off}$$
$$= \frac{K1\times V_{IN}}{R_{RT}\times C_{OFF}}\times R_{RT}C_{ON}\left(\frac{K2}{K1}\right)\frac{V_{IN}-V_{OUT}}{V_{IN}}$$
$$= K2\left(\frac{C_{ON}}{C_{OFF}}\right)(V_{IN}-V_{OUT}) = V3 - V_{steady}$$

Where, a voltage level $V_{steady}$ represents an ideal steady level of the error signal $V_{ERR}$ in FIG. 1. Therefore, by varying the equation (1), the voltage level $V_{steady}$ of the error signal $V_{ERR}$ can be represented by a following equation (2)

$$V_{steady} = V3 - K2\left(\frac{C_{ON}}{C_{OFF}}\right)(V_{IN}-V_{OUT}) \quad (2)$$
$$= K3\times K1(V_{IN}-V_{OUT}) - K2\left(\frac{C_{ON}}{C_{OFF}}\right)(V_{IN}-V_{OUT})$$
$$= \left((K3\times K1) - K2\left(\frac{C_{ON}}{C_{OFF}}\right)\right)(V_{IN}-V_{OUT})$$

By using suitable constants K1, K2, K3 and capacitors $C_{ON}$ and $C_{OFF}$, the error signal $V_{ERR}$ can be design to a DC operating voltage level, i.e. the ideal steady level $V_{steady}$.

Referring to FIG. 1, the feedback circuit of the multi-phase DC-DC power converter 100 can automatically fine-tunes the error signal $V_{ERR}$ according to the DC operating voltage level determined by the error signal $V_{ERR}$, so as to determine a time period for triggering the trigger signal $S_{TR}$ for each cycle T of the PWM signal $S_{PWM}$. Therefore, the PWM controller of a virtual fixed frequency is achieved.

Figure 3:
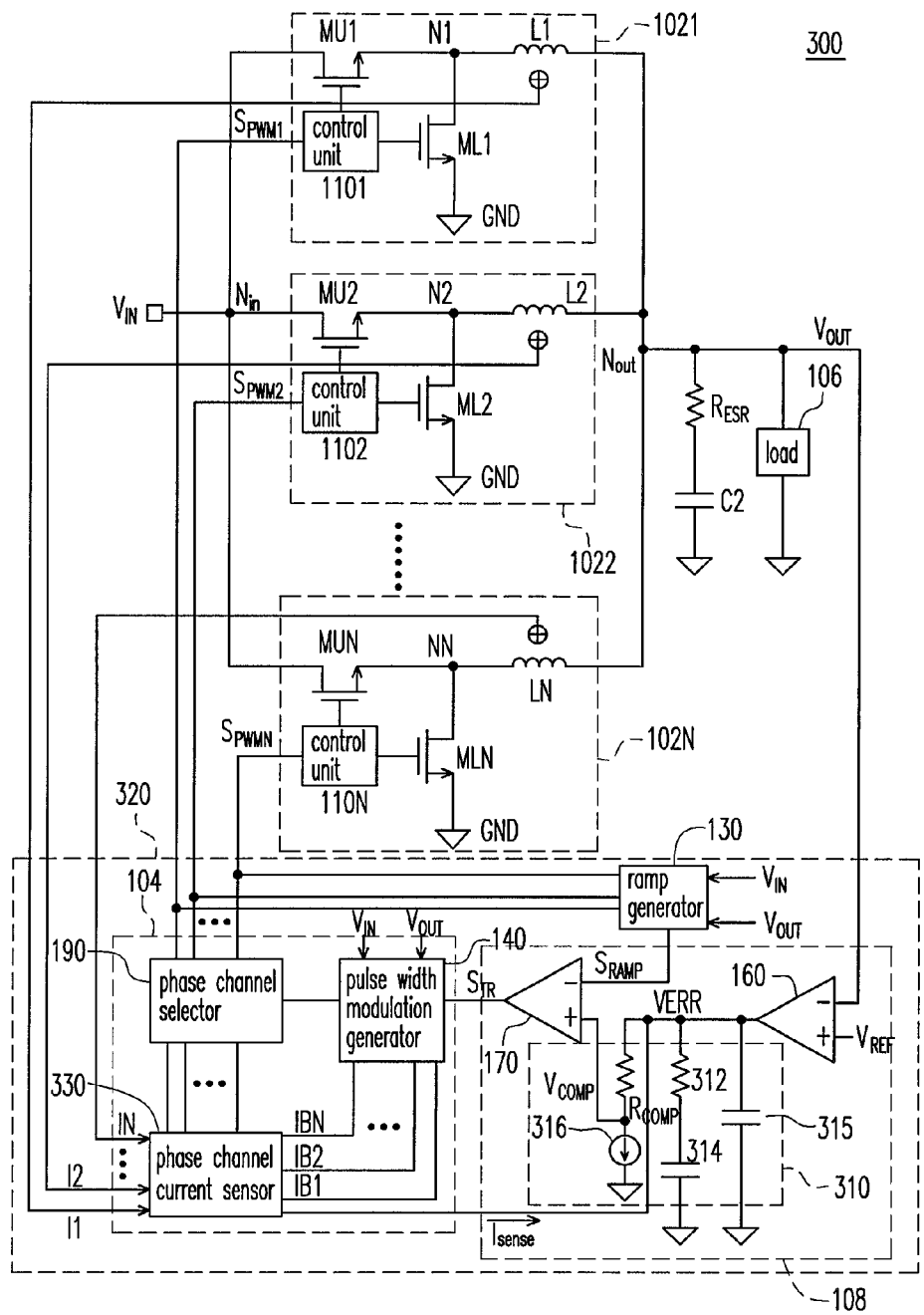
FIGS. 3-6 is a schematic diagram of multi-phase DC-DC power converters according to other embodiments of the invention.

FIG. 3 is a schematic diagram of a multi-phase DC-DC power converter 300 according to another embodiment of the invention. The multi-phase DC-DC power converter 300 applies an output capacitor C2 having a relatively low ESR or zero ESR. A difference between the multi-phase DC-DC power converter 300 and the multi-phase DC-DC power converter 100 of FIG. 1 is that the PWM generation module 104 is further coupled to the output terminal of the error amplifier 160, and the PWM generation module 104 is further used to sense currents flowing through the inductors L1-LN and outputs a sensing current $I_{sense}$ to a compensation unit 310 in response to a load amount of the load 106. Namely, a phase channel current sensor 330 of the multi-phase DC-DC power converter 300 senses the currents flowing through the inductors L1-LN and outputs the sensing current $I_{sense}$ to the compensation unit 310 in response to the load amount of the load 106. Moreover, the compensation unit 310 includes a resistor 312, capacitors 314 and 315, a resistor $R_{comp}$ and a current source 316. The resistor $R_{comp}$ is coupled between the output terminal of the error amplifier 160 and the positive input terminal of the comparator 170. The current source 316 is coupled between the positive input terminal of the comparator 170 and the ground terminal GND. The resistor 312 and the capacitor 314 are connected in series between the output terminal of the error amplifier 160 and the ground terminal GND, and the resistor 315 is coupled between the output terminal of the error amplifier 160 and the ground terminal GND.

The current source 316 is used for extracting a current I2A from the resistor $R_{comp}$ to the ground GND. In some embodiments, the current I2A is proportional to the sensing current $I_{sense}$, though the invention is not limited thereto. In the present embodiment, a current value of the current I2A is the same to a current value of the sensing current $I_{sense}$. A cross voltage of the resistor $R_{comp}$ can be determined according to the sensing current $I_{sense}$ and a resistance of the resistor $R_{comp}$. The compensation unit 310 receives the error signal $V_{ERR}$, and generates a compensation signal $V_{COMP}$ to the capacitor 170 according to the error signal $V_{ERR}$ and the cross voltage of the resistor $R_{comp}$. The comparator 170 of a PWM controller 320 compares the compensation signal $V_{COMP}$ to the ramp signal $S_{RAMP}$ provided by the ramp generator 130 to generate the trigger signal $S_{TR}$. The compensation signal $V_{COMP}$ includes a feedback signal of the output voltage $V_{OUT}$ and a feedback signal of the currents flowing through the inductors L1-LN, so that harmonic oscillation is avoided and it is ensured that the regulated output voltage $V_{OUT}$ is provided when the output capacitor C2 has relatively small ESR. Moreover, a gain of the current loop component can be adjusted by adjusting the resistor $R_{comp}$ or detecting a gain of the sensing current $I_{sense}$, so as to improve system stability.

Figure 4:
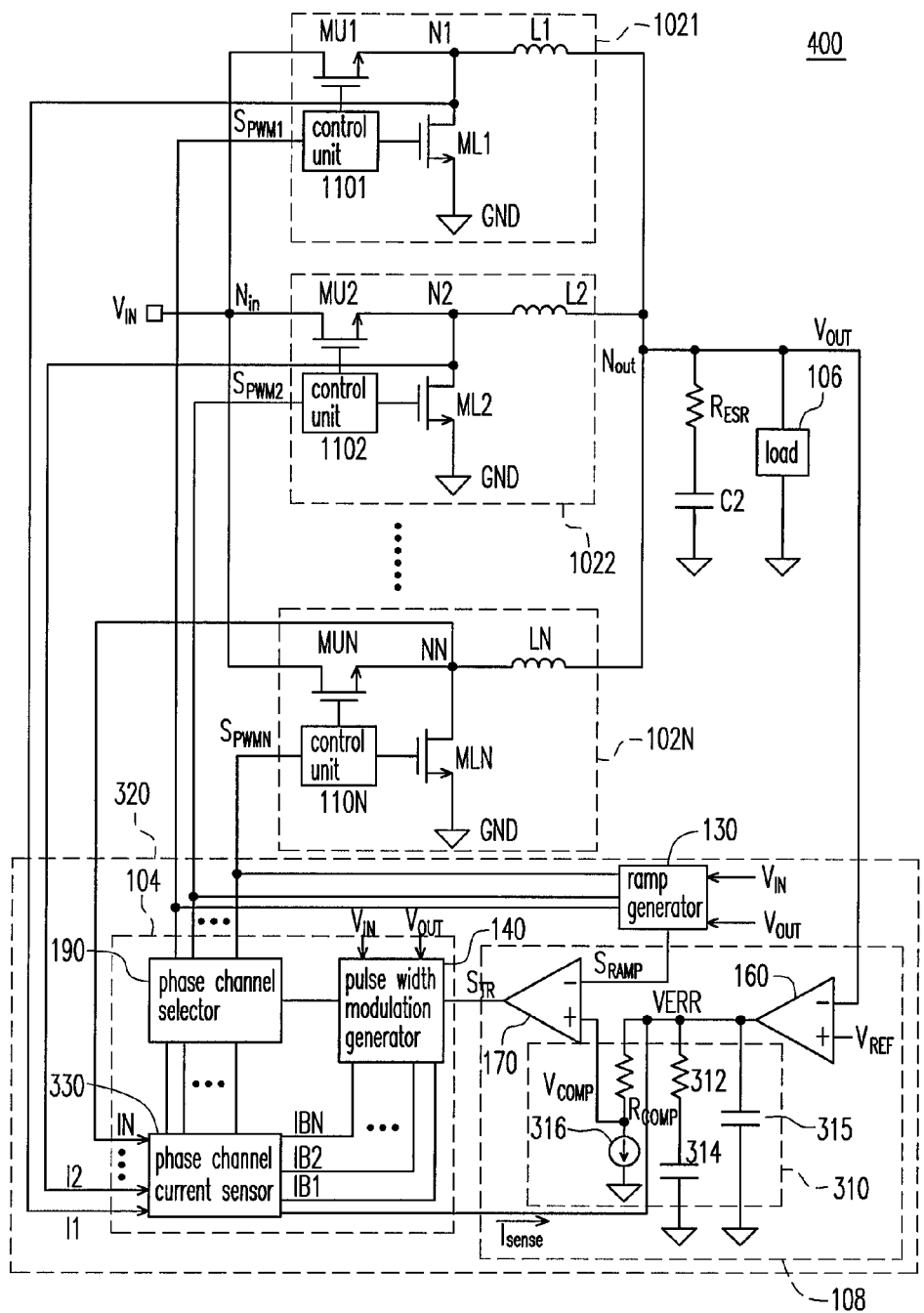

FIG. 4 is a schematic diagram of a multi-phase DC-DC power converter 400 according to still another embodiment of the invention. Compared to the multi-phase DC-DC power converter 300 of FIG. 3, the phase channel current sensor 330 of the multi-phase DC-DC power converter 400 is coupled to the nodes N1-NN between the transistors MU1-MUN and the transistors ML1-MLN for sensing the currents flowing through the transistors ML1-MLN to produce the sensing current $I_{sense}$. Similarly, the sensing current $I_{sense}$ provided by the phase channel current sensor 330 corresponds to the load amount of the load 106.

Figure 5:
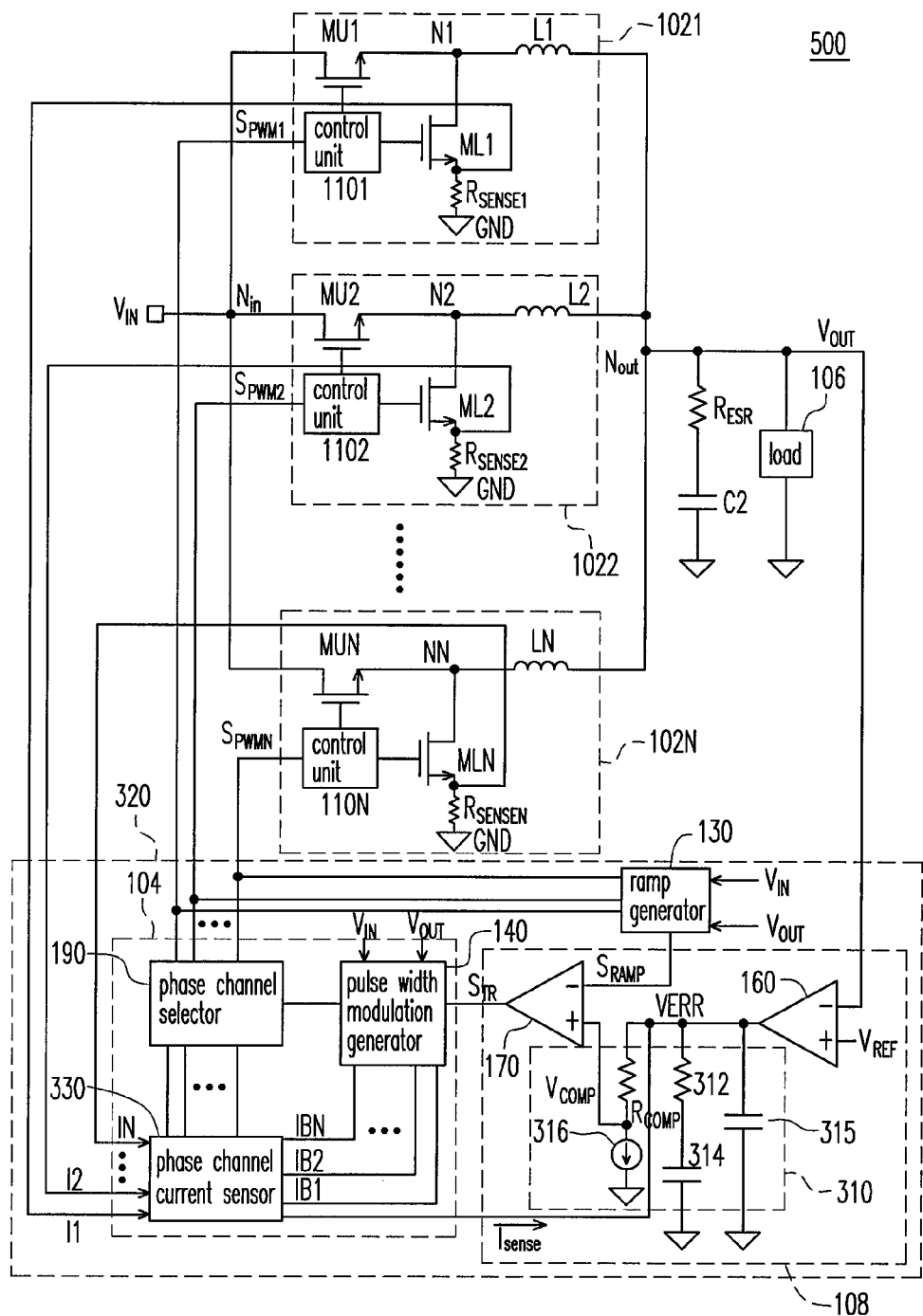

FIG. 5 is a schematic diagram of a multi-phase DC-DC power converter 500 according to yet another embodiment of the invention. Compared to the multi-phase DC-DC power converter 300 of FIG. 3, the multi-phase DC-DC power converter 500 further includes resistors $R_{SENSE1}$-$R_{SENSEN}$ respectively coupled between the transistors ML1-MLN and the ground terminal GND. Moreover, the phase channel current sensor 330 of the multi-phase DC-DC power converter 500 is coupled to the resistors $R_{SENSE}$ for sensing the currents flowing through the resistors $R_{SENSE}$ to produce the sensing current $I_{sense}$. Similarly, the sensing current $I_{sense}$ provided by the phase channel current sensor 330 corresponds to the load amount of the load 106.

Figure 6:
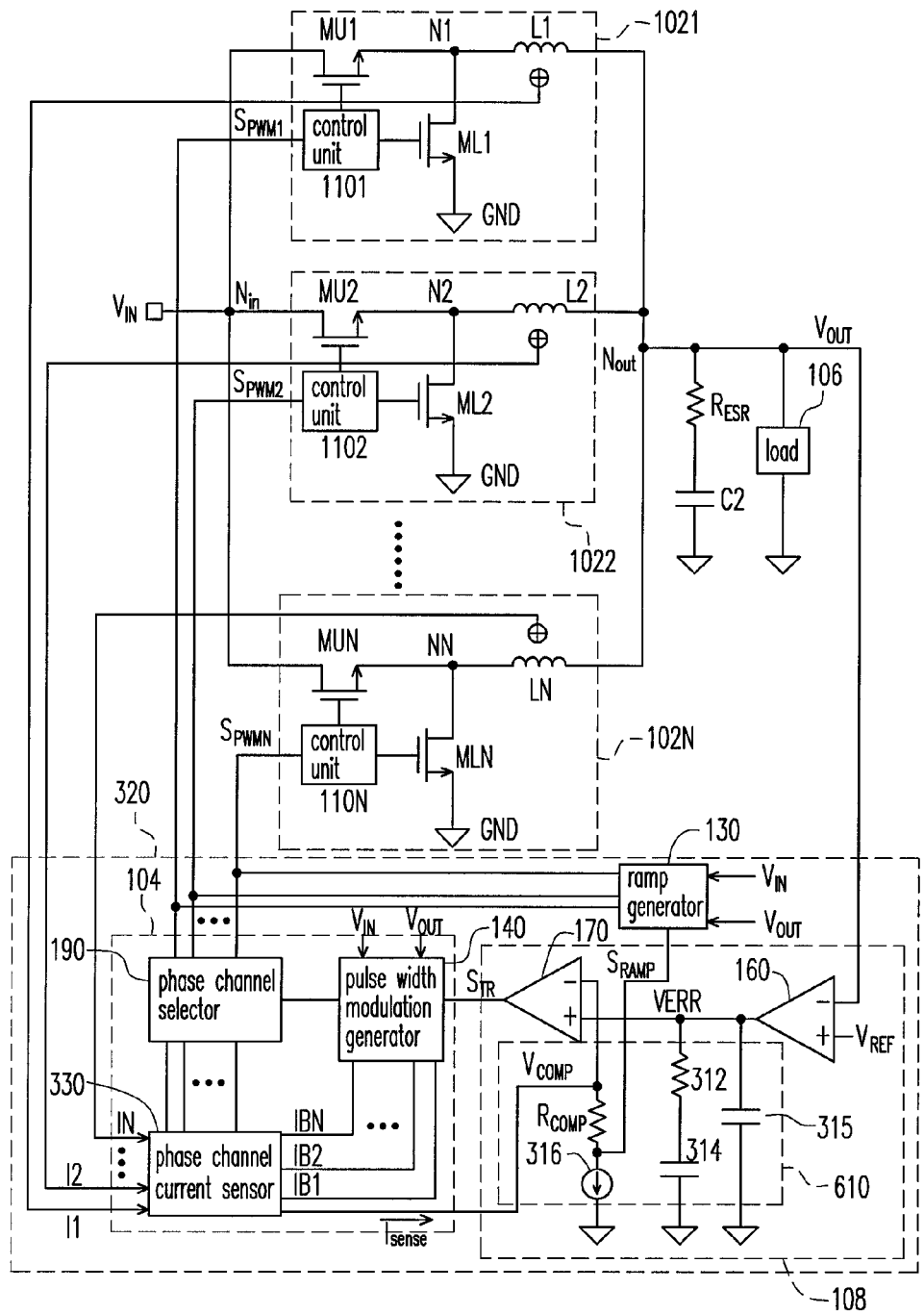

FIG. 6 is a schematic diagram of a multi-phase DC-DC power converter 600 according to still another embodiment of the invention. In the present embodiment, the PWM generation module 104 of the multi-phase DC-DC power converter 600 is coupled to the negative output terminal of the comparator 170. Namely, the phase channel current sensor 330 in the PWM generation module 104 is coupled to the negative output terminal of the comparator 170. Moreover, the resistor $R_{COMP}$ in the compensation unit 310 is coupled between the negative input terminal of the comparator 170 and the current source 316. The positive input terminal of the comparator 170 is coupled to the output terminal of the error amplifier 160. The comparator 170 compares the error signal $V_{ERR}$ to the compensation signal $V_{comp}$ provided by the compensation unit 310 to generate the trigger signal $S_{TR}$.

The phase channel current sensor 330 senses the currents flowing through the inductors L1-LN to produce the sensing current $I_{sense}$, where the sensing current $I_{sense}$ corresponds to the load amount of the load 106. In some embodiments, the phase channel current sensor 330 can also sense the currents flowing through the transistors ML1-MLN to produce the sensing current $I_{sense}$. Moreover, in other embodiments, the multi-phase DC-DC power converter 600 can also include the resistors $R_{SENSE1}$-$R_{SENSEN}$ of FIG. 5, which are respectively coupled between the transistors ML1-MLN and the ground terminal GND, so that the phase channel current sensor 330 can sense the currents flowing through the resistors $R_{SENSE1}$-$R_{SENSEN}$ to produce the sensing current $I_{sense}$.

The current source 316 extracts the current I2A from the resistor $R_{comp}$ to the ground terminal GND. The compensation unit 310 generates the compensation signal $V_{COMP}$ to the comparator 170 according to the sensing current $I_{sense}$, the cross voltage of the resistor $R_{comp}$ and the ramp signal $S_{RAMP}$. Similarly, the compensation signal $V_{COMP}$ includes a feedback signal of the output voltage $V_{OUT}$ and a feedback signal of the currents flowing through the inductors L1-LN, so that harmonic oscillation is avoided and it is ensured that the regulated output voltage $V_{OUT}$ is provided when the output capacitor C2 has relatively small ESR. Moreover, a gain of the current loop component can be adjusted by adjusting the resistor $R_{comp}$ or detecting a gain of the sensing current $I_{sense}$, so as to improve system stability.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A multi-phase direct current (DC)-DC power converter, comprising:
   a plurality of output stage circuits receiving an input voltage and providing an output voltage;
   a ramp generator generating a ramp signal, wherein the ramp signal has fixed rising and falling slopes;
   a feedback circuit coupled to the ramp generator and output terminals of the output stage circuits, the feedback circuit generating a trigger signal according to the output voltage and the ramp signal;
   a pulse width modulation (PWM) generator coupled to the feedback circuit and generating a PWM signal according to the trigger signal, the input voltage and the output voltage;
   a phase channel current sensor coupled to the PWM generator and sensing output currents of the output stage circuits to calculate output current differences of the output stage circuits, so as to output a plurality of error current signals to the PWM generator, wherein the PWM generator adjusts a duty cycle of the PWM signal according to the error current signals; and
   a phase channel selector respectively coupled to the PWM generator, the ramp generator, the phase channel current sensor and the output stage circuits, the phase channel selector controlling operations of the output stage circuits and respectively outputting a plurality of PWM selection signals to the ramp generator and the phase channel current sensor according to the PWM signal generated by the PWM generator.

2. The multi-phase DC-DC power converter as claimed in claim 1, wherein the feedback circuit comprises:
   an error amplifier receiving a reference voltage and the output voltage, and generating an error signal according to a voltage difference between the reference voltage and the output voltage; and
   a comparator having a positive input terminal coupled to an output terminal of the error amplifier and comparing the error signal with the ramp signal to produce the trigger signal.

3. The multi-phase DC-DC power converter as claimed in claim 2, wherein the feedback circuit further comprises:
   a compensation unit coupled between the output terminal of the error amplifier and a ground terminal, the compensation unit compensating the error signal.

4. A multi-phase DC-DC power converter, comprising:
   a plurality of output stage circuits converting an input voltage into an output voltage; and
   a pulse width modulation (PWM) controller coupled to input terminals and output terminals of the output stage circuits and adjusting a pulse width of a PWM signal thereof according to the input voltage, the output voltage and a reference voltage to sequentially control the output stage circuits, so as to convert the input voltage into the output voltage, and the PWM controller comprising:
   a PWM generation module generating the PWM signal with a constant on time and adjusting a duty cycle of the PWM signal according to a trigger signal, the input voltage and the output voltage, the PWM generation module outputting a sensing current according to a load of the multi-phase DC-DC power converter, wherein the PWM generation module comprises:
   a PWM generator coupled to a phase channel selector and generating the PWM signal according to the trigger signal, the input voltage and the output voltage;
   a phase channel current sensor coupled to the phase channel selector and the PWM generator, the phase channel current sensor sensing output currents of the output stage circuits to calculate output current differences of the output stage circuits, so as to output a plurality of error current signals to the PWM generator, wherein the PWM generator adjusts a duty cycle of the PWM signal according to the error current signals, the phase channel current sensor outputting the sensing current in response to the load amount of the load of the multi-phase DC-DC power converter; and the phase channel selector respectively coupled to the PWM generator, a ramp generator, the phase channel current sensor and the output stage circuits, the phase channel selector controlling operations of the output stage circuits and respectively outputting a plurality of PWM selection signals to the ramp generator and the phase channel current sensor according to the PWM signal generated by the PWM generator;

the ramp generator coupled to the PWM module and generating a ramp signal, wherein the ramp signal has fixed rising and falling slopes; and a feedback circuit coupled to the ramp generator, the output terminals of the output stage circuits and the PWM generation module, the feedback circuit outputting the trigger signal according to the sensing current, the output voltage and the ramp signal.

5. The multi-phase DC-DC power converter as claimed in claim 4, wherein the feedback circuit comprises:
an error amplifier receiving the reference voltage and the output voltage and generating an error signal according to a voltage difference between the reference voltage and the output voltage;
a comparator comparing a compensation signal with the ramp signal to produce the trigger signal; and
a compensation unit coupled to an output terminal of the error amplifier and a positive input terminal of the comparator, the compensation unit generating the compensation signal according to the error signal and the sensing current.

6. The multi-phase DC-DC power converter as claimed in claim 5, wherein the compensation unit comprises:
a resistor coupled between the output terminal of the error amplifier and the positive input terminal of the comparator, wherein the compensation unit generates the compensation signal according to the error signal and a cross voltage of the resistor.

7. A multi-phase DC-DC power converter, comprising:
a plurality of output stage circuits converting an input voltage into an output voltage; and
a PWM controller coupled to input terminals and output terminals of the output stage circuits, the PWM controller adjusting a pulse width of a PWM signal thereof according to the input voltage, the output voltage and a reference voltage to sequentially control the output stage circuits, so as to convert the input voltage into the output voltage, and the PWM controller comprising:
a PWM generation module generating the PWM signal with a constant on time, adjusting a duty cycle of the PWM signal according to a trigger signal, the input voltage and the output voltage, and outputting a sensing current according to a load amount of a load of the multi-phase DC-DC power converter, wherein the PWM generation module comprises:
a PWM generator coupled to a phase channel selector and generating the PWM signal according to the trigger signal, the input voltage and the output voltage;
a phase channel current sensor coupled to the phase channel selector and the PWM generator, the phase channel current sensor sensing output currents of the output stage circuits to calculate output current differences of the output stage circuits, so as to output a plurality of error current signals to the PWM generator, wherein the PWM generator adjusts a duty cycle of the PWM signal according to the error current signals, and outputs the sensing current in response to the load amount of the load of the multi-phase DC-DC power converter; and
a phase channel selector respectively coupled to the PWM generator, a ramp generator, the phase channel current sensor and the output stage circuits, the phase channel selector controlling operations of the output stage circuits and respectively outputting a plurality of PWM selection signals to the ramp generator and the phase channel current sensor according to the PWM signal generated by the PWM generator;

the ramp generator, coupled to the PWM module, and generating a ramp signal, wherein the ramp signal is a sawtooth wave having fixed rising and falling slopes; and a feedback circuit, coupled to the ramp generator, the output terminals of the output stage circuits and the PWM generation module, and outputting the trigger signal according to the sensing current, the output voltage and the ramp signal.

8. The multi-phase DC-DC power converter as claimed in claim 7, wherein the feedback circuit comprises:
an error amplifier receiving the reference voltage and the output voltage and generating an error signal according to a voltage difference between the reference voltage and the output voltage;
a comparator having a positive input terminal coupled to an output terminal of the error amplifier, the comparator comparing a compensation signal with the error signal to produce the trigger signal; and
a compensation unit coupled to a negative input terminal of the comparator and the PWM generation module, the compensation unit generating the compensation signal according to the ramp signal and the sensing current.

9. The multi-phase DC-DC power converter as claimed in claim 8, wherein the compensation unit comprises:
a resistor coupled between a phase channel current sensor and the ramp generator, wherein the compensation unit generates the compensation signal according to the sensing current, the ramp signal and a cross voltage of the resistor.

* * * * *